(12) United States Patent
Kasai et al.

(10) Patent No.: US 9,252,886 B2
(45) Date of Patent: Feb. 2, 2016

(54) OPTICAL TRANSMITTER

(71) Applicant: Sumitomo Electric Industries, Ltd., Osaka-shi (JP)

(72) Inventors: Shinta Kasai, Yokohama (JP); Kengo Matsumoto, Yokohama (JP); Hiromi Tanaka, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 14/163,665

(22) Filed: Jan. 24, 2014

(65) Prior Publication Data

US 2014/0205277 A1  Jul. 24, 2014

(30) Foreign Application Priority Data

Jan. 24, 2013 (JP) ................. 2013-011267
Jan. 24, 2013 (JP) ................. 2013-011268

(51) Int. Cl.
*H04B 10/564* (2013.01)
*H04B 10/516* (2013.01)
*H04B 10/50* (2013.01)

(52) U.S. Cl.
CPC .......... *H04B 10/564* (2013.01); *H04B 10/5057* (2013.01); *H04B 10/516* (2013.01)

(58) Field of Classification Search
CPC .................................................... H04B 10/516
See application file for complete search history.

(56) References Cited

U.S. PATENT DOCUMENTS

| 7,181,146 B1* | 2/2007 | Yorks ........................... 398/195 |
| 7,308,060 B1* | 12/2007 | Wall et al. ..................... 375/355 |
| 7,542,483 B1* | 6/2009 | Gianella et al. ............... 370/503 |
| 2002/0031146 A1* | 3/2002 | Abbas et al. ................... 370/476 |
| 2002/0039211 A1* | 4/2002 | Shen et al. .................... 359/110 |

FOREIGN PATENT DOCUMENTS

| JP | 2000-059317 A | 2/2000 |
| JP | 2001-257645 A | 9/2001 |
| JP | 2002-044035 A | 2/2002 |
| JP | 2003-348021 A | 12/2003 |
| JP | 2004-312396 A | 11/2004 |
| JP | 2007-325189 A | 12/2007 |

* cited by examiner

*Primary Examiner* — Nathan Curs
(74) *Attorney, Agent, or Firm* — Venable LLP; Michael A. Sartori; Trent B. Ostler

(57) ABSTRACT

Disclosed is an optical transceiver 1 including a phase locked loop circuit 3a configured to receive a reference clock $CL_1$ and remove a jitter component of the reference clock $CL_1$; a second phase locked loop circuit 3b configured to receive an output of the first phase locked loop circuit, generate a multiplied clock $CL_3$ synchronized with the output, and when the frequency of the output deviates from a predetermined range and is in an abnormal state, output an alarm signal $ALM_1$; and an optical transmitter module 5 configured to output an optical output signal modulated based on the multiplied clock $CL_3$ and electrical signals $D_1$, $D_2$, $D_3$, and $D_4$ from the outside.

7 Claims, 12 Drawing Sheets

Fig. 8

| Set value/Calculation value | When on | When off | When off, readjust cross point |
|---|---|---|---|
| Rout [Ω] | 50 | 50 | 50 |
| Peak-to-peak value of Iout [mA] | 80 | 80 | 80 |
| Set value of cross point of Iout [%] | 15 | 15 | 45 |
| Ratio of Ioutdc to peak value [%] | 45 | 15 | 45 |
| Ioutdc [mA] | 36 | 12 | 36 |
| Vbias [V] | -0.5 | -0.5 | -0.5 |
| Veadc [V] | -2.3 | -1.1 | -2.3 |

OPTICAL TRANSMITTER

BACKGROUND OF THE INVENTION

1. Field of the Invention

The present invention relates to an optical transmitter for generating an optical output signal based on an electrical signal.

2. Related Background of the Invention

IEEE 802.3ba and IEEE 802.3bg are formulated as standards of optical transmission networks in order to resolve a bottleneck of a transmission capacity of communication between servers in a data center and the like. In response to these standards, transmission rate of an optical transmission system or an optical transceiver mounted to the optical transmission system is required to be extended to 40 Gbps or 100 Gbps. In order to generate an optical output signal having high quality, the transmission rate of which is 40 Gbps, an optical transmitter (including a transmission part of an optical transceiver) utilizes an Electro-Absorption (EA) modulator as an optical modulator, and utilizes a modulator driving circuit to drive the EA modulator. Further, a control circuit is embedded in the optical transmitter. The control circuit receives setting information from a host system to control each of parts inside the optical transmitter, and concurrently monitors each of the parts, to notify the host system of various information such as an alarm and so on.

As a modulator driving circuit, for example, a circuit having a cross point adjustment function for adjusting a cross point of a waveform of an optical output signal is disclosed in Patent Literature 1. Further, a circuit for adjusting a cross point of a driving signal output from a semiconductor laser driving circuit is disclosed in Patent Literature 2.

Further, the optical transmitter properly controls the optical output signal according to the monitoring the status of the parts. For example, a wavelength division multiplex transmission system disclosed in Patent Literature 5 performs a control to maintain an optical output signal at a proper power level even when an input signal of a transmission system, having a certain wavelength, is shut off or in a non-synchronous state. Further, an optical transmitter disclosed in Patent Literature 6 controls an optical output signal by coping with a root cause of an anomaly in an automatic power control.

Patent Literature 1: Japanese Patent Laid-Open Publication No. 2000-59317.

Patent Literature 2: Japanese Patent Laid-Open Publication No. 2004-312396.

Patent Literature 3: Japanese Patent Laid-Open Publication No. 2001-257645.

Patent Literature 4: Japanese Patent Laid-Open Publication No. 2003-348021.

Patent Literature 5: Japanese Patent Laid-Open Publication No. 2002-44035.

Patent Literature 6: Japanese Patent Laid-Open Publication No. 2007-325189.

The above-mentioned optical transmitter corresponding to the related prior art performs a control to shut off a multiplexed electrical signal in order to prevent abnormal random noise from being output to the optical transmission network when an electrical signal or a reference clock given from the host system loses a predetermined frequency or a sufficient amplitude. After the control to shut off an optical output signal is performed, when the electrical signal or the reference clock is recovered, a control to resume the output of the optical output signal is generally performed.

Further, a method of a feedback control based on an optical output power as disclosed in Patent Literature 3, or a method of preventing excessive light emission by attaching a device for limiting optical output power to the outside regarding an optical transmitter using a direct modulation laser diode as disclosed in Patent Literature 4 has been known.

Therefore, an aspect of the present invention is to provide an optical transmitter which can continue normally operation when a clock signal or an electrical signal given from the outside by a host system or the like goes into an abnormal state and comes back from the abnormal state.

SUMMARY OF THE INVENTION

An aspect of the present invention is to provide an optical transmitter including a first phase locked loop circuit configured to receive a reference clock and remove a jitter component of the reference clock; a second phase locked loop circuit configured to receive an output of the first phase locked loop circuit, generate a multiplied clock synchronized with the output, and when the frequency of the output deviates from a predetermined range and is in an abnormal state, output an alarm signal; and an optical transmitting circuit configured to receive the multiplied clock and electrical signals from the outside, and output an optical output signal modulated based on the electrical signals.

Another aspect of the present invention is to provide an optical transmitter including a phase locked loop circuit configured to receive a reference clock signal from the outside, generate a first clock signal based on the reference clock signal, output the generated first clock signal, and when the reference clock signal is abnormal, output a first alarm signal; a frame processing part configured to receive the electrical input signal from the outside and the first clock signal from the phase locked loop circuit, generate a second clock signal synchronized with the electrical input signal, read in data by sampling with the second clock signal, output the data by sampling with the first clock signal, and when the first clock signal and the second clock signal are not synchronized with each other, output a second alarm signal; an optical transmitting circuit configured to output an optical output signal based on the data output from the frame processing part; and a control circuit configured to, when the first alarm signal or the second alarm signal is activated, perform a control to shut off the optical output signal, and then when the first alarm signal or the second alarm signal is deactivated, perform a control to reset the phase locked loop circuit and then reset the frame processing part.

BRIEF DESCRIPTION OF THE DRAWINGS

FIG. 8 is a table illustrating an example of calculating a Direct Current (DC) component of an applied voltage for an EA modulator when a multiplexed signal is in an on-state and in an off-state.

DESCRIPTION OF THE PREFERRED EMBODIMENTS

Figure 1:
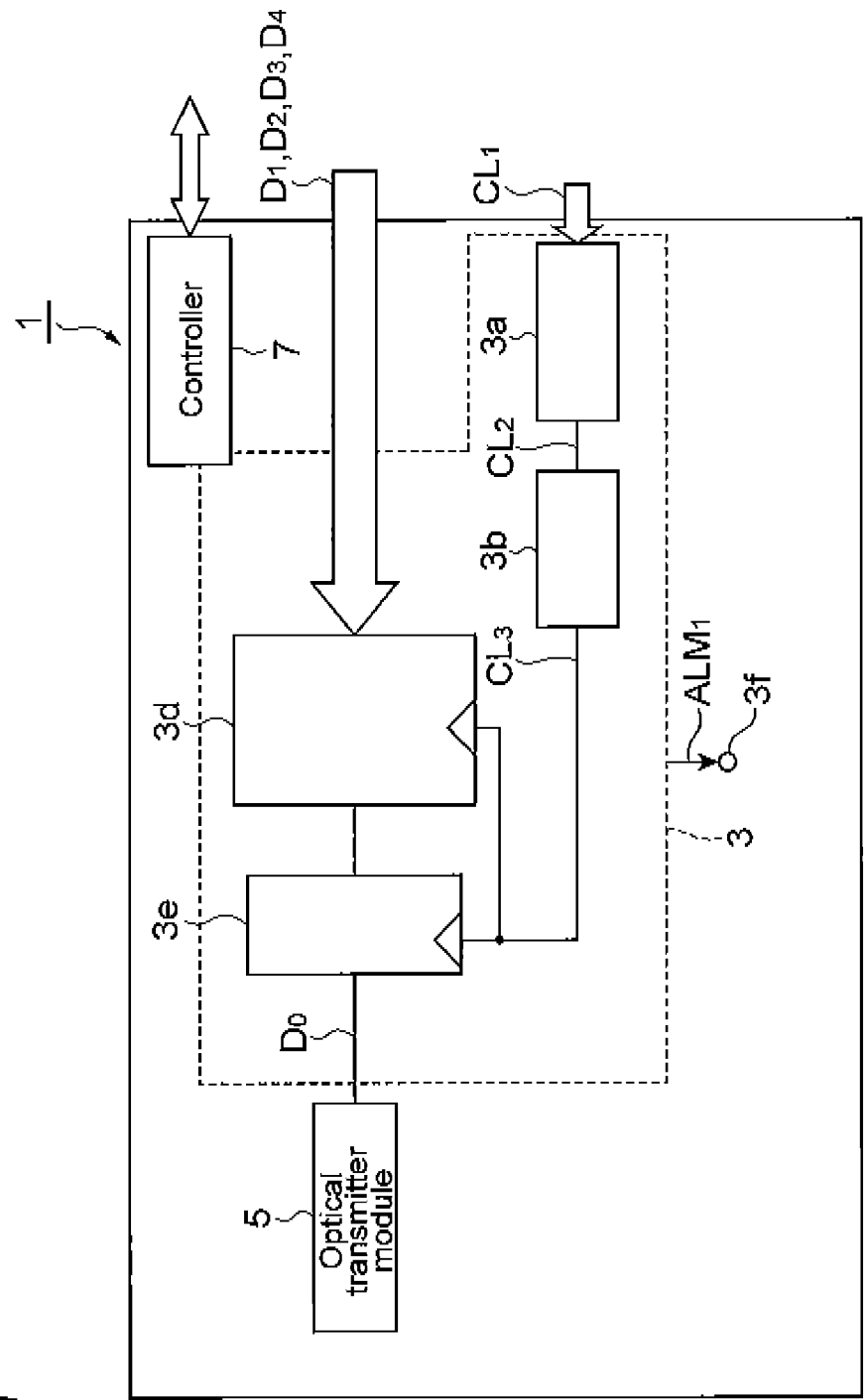
FIG. 1 is a block diagram illustrating a schematic configuration of an optical transmitter according to a first embodiment of the present invention.

Hereinafter, embodiments of the present invention will be described in detail with reference to the accompanying drawings. Further, in the description of the drawings, the same elements will be designated by the same reference numerals as far as possible and a duplicate description thereof will be omitted. An optical transceiver 1 according to the present embodiment includes an optical transmitter which receives an electrical signal input from a host system which is an external electronic equipment and outputs an optical output signal based on the electrical signal.

First Embodiment

Figure 2:
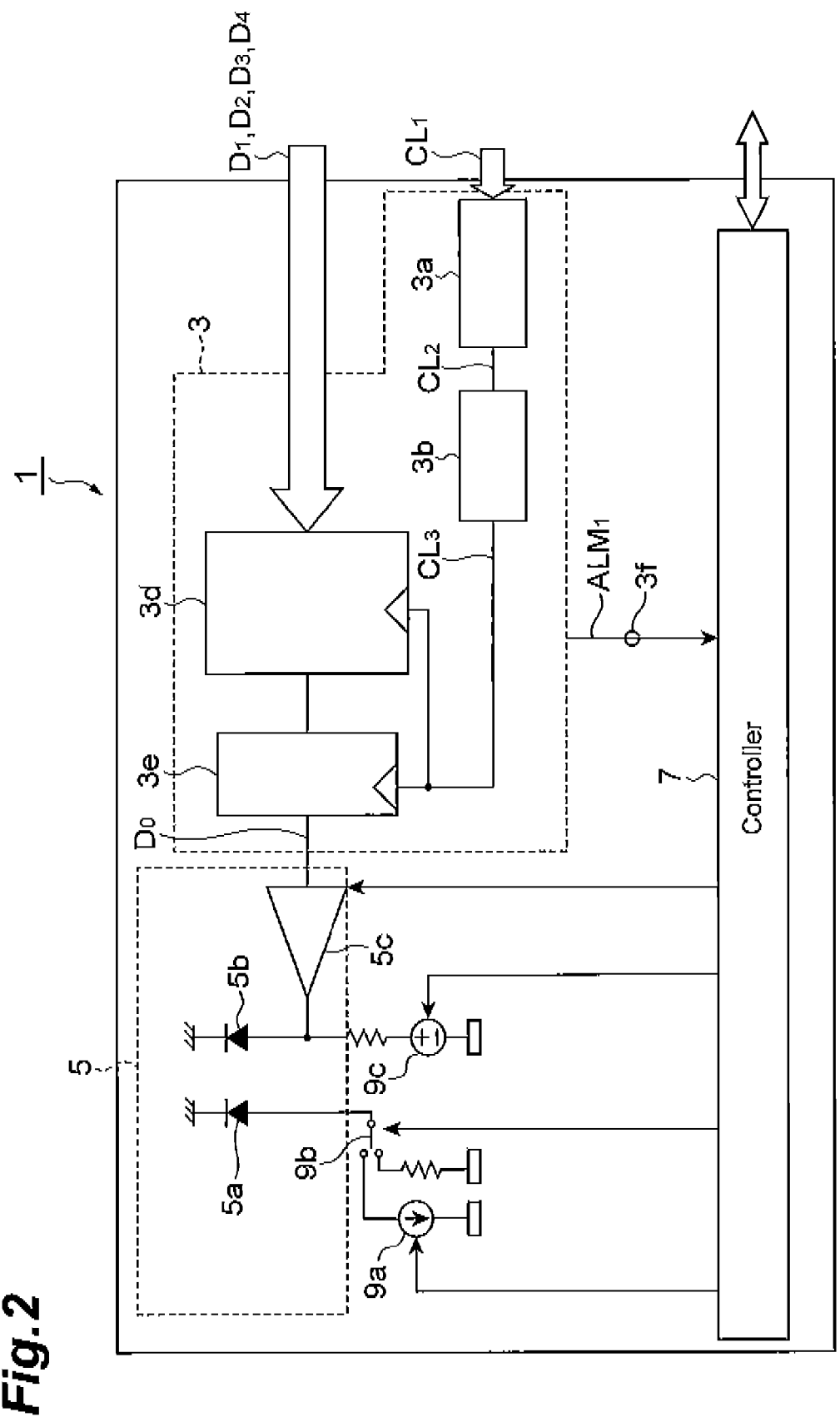
FIG. 2 is a block diagram illustrating a connection configuration of a controller (control circuit) of the optical transmitter of FIG. 1 in detail.

A configuration of the optical transceiver 1 according to a first embodiment of the present invention will be described with reference to FIGS. 1 and 2. As illustrated in FIGS. 1 and 2, the optical transceiver 1 includes a multiplexing part 3 for receiving a reference clock signal and four pairs of electrical signals synchronized with the reference clock signal, transmission rate of which, for example, 10 Gbps from an external host system, and multiplexing these signals to an electrical signal having a transmission rate of, for example, 40 Gbps to output the signal, an optical transmitter module 5 for generating an optical output signal based on the electrical signal received from the multiplexing part 3 to output the optical output signal to an optical transmission network, and a controller 7.

The multiplexing part 3 is configured by Integrated Circuits (ICs) and mainly includes phase locked loop circuits $3a$ and $3b$, a frame processing part $3d$, and multiplexing processing part $3e$. The phase locked loop circuit $3a$ receives a reference clock $CL_1$ having a predetermined frequency from the outside, removes a jitter component of the reference clock $CL_1$, and outputs the reference clock $CL_2$. The phase locked loop circuit $3a$ is configured by a phase locked loop circuit, in which the bandwidth of a Phase Locked Loop (PLL) is narrowed to be narrower than or equal to 1 KHz, to sufficiently remove the jitter component of the reference clock $CL_1$. The phase locked loop circuit $3b$ receives the reference clock $CL_2$ output from the phase locked loop circuit $3a$, generates a multiplied clock $CL_3$ synchronized with the reference clock $CL_2$, and outputs the multiplied clock $CL_3$. The phase locked loop circuit $3b$ has a bandwidth of the PLL which is widened to be wider than or equal to several MHz, as compared to the phase locked loop circuit $3a$. Further, when the frequency of the input reference clock $CL_2$ deviates from a predetermined frequency range or the amplitude of the reference clock $CL_2$ is smaller than a specified value, the phase locked loop circuit $3b$ judges these cases to be abnormality for the reference clock $CL_2$, and outputs (activates) an alarm signal $ALM_1$. In addition, when a frequency of the reference clock $CL_2$ deviates from a predetermined frequency range so that the reference clock $CL_2$ is judged to be in an abnormal state, the phase locked loop circuit $3b$ performs free-running oscillation and outputs the reference clock $CL_2$ having a predetermined frequency which is generated from the free-running oscillation.

The phase locked loop circuit $3b$ of the multiplexing part 3 receives the reference clock $CL_2$ output from the phase locked loop circuit $3a$, multiplies the reference clock $CL_2$, and then outputs the multiplied clock $CL_3$. For example, the phase locked loop circuit $3b$ generates a clock corresponding to a transmission rate of an electrical signal from the host system and a clock corresponding to a transmission rate of an electrical signal multiplexed by the multiplexing processing part $3e$, and outputs the clocks to the frame processing part $3d$ and the multiplexing processing part $3e$, respectively. The frame processing part $3d$ receives four pairs of electrical signals $D_1$, $D_2$, $D_3$, and $D_4$ input from the host system, and performs frame-processing by using the clocks generated by the phase locked loop circuit $3b$. By the frame-processing, time-series data included in the four pairs of the electrical signals is synchronized with each other and is serially output to the multiplexing processing part $3e$. Further, when abnormal states of the frequencies and the amplitudes of the electrical signals $D_1$, $D_2$, $D_3$, and $D_4$ are detected, the frame processing part $3d$ generates and outputs (activates) the alarm signal $ALM_1$. The multiplexing processing part $3e$ receives the four pairs of time-series data from the frame processing part $3d$ and multiplexes the time-series data by using the clocks generated by the phase locked loop circuit $3b$. By the multiplexing processing, an electrical signal $D_0$ is generated by multiplexing the four pairs of time-series data and is output to the optical transmitter module 5.

Herein, the optical transceiver 1 is configured such that the alarm signal $ALM_1$ output from the multiplexing part 3 may be notified to the controller 7. For example, the multiplexing part 3 and the controller 7 may be electrically connected to each other such that the alarm signal $ALM_1$ is notified to the controller 7 via a hard pin (control terminal) $3f$ of the IC including the multiplexing part 3, or alarm state information may be notified to the controller 7 from the multiplexing part 3 by storing the alarm state information based on the alarm signal $ALM_1$ in a register inside the IC. In the present embodiment, it is preferred to adopt a configuration of notifying of the alarm signal $ALM_1$ via the hard pin $3f$ in order to improve control speed of shutting off the optical output signal. That is, as mentioned below, the hard pin $3f$ is prepared in order to control shutting off of the optical output signal by the controller 7, and the controller 7 is configured to shut off the optical output signal when receiving the alarm signal $ALM_1$ via the hard pin $3f$.

The optical transmitter module 5 includes a laser diode $5a$ for generating an optical output signal (CW light), an EA modulator $5b$ for modulating the optical output signal, and a modulator driving circuit $5c$ for driving the EA modulator $5b$. The modulator driving circuit $5c$ modulates the optical output signal transmitted from the laser diode $5a$ to the outside based on data included in the electrical signal $D_0$ by increasing and decreasing a driving voltage applied to the EA modulator $5b$ based on the electrical signal $D_0$ output from the multiplexing part 3. In the optical transmitter module 5 having such a configuration, a current source 9a for supplying a bias current to the laser diode 5a is connected to the laser diode 5a via a switch 9b, and a bias voltage source 9c for applying a bias voltage to the EA modulator 5b is connected to the EA modulator 5b.

The controller 7 corresponds to an operational circuit configured by a microprocessor, DA convertors, AD convertors, memories and others. The controller 7 receives various setting information from the host system to control the parts of the optical transceiver 1, monitors the status of the parts of the optical transceiver 1 and the status of a signal from the outside, and concurrently notifies the host system of various information such as an alarm signal according to the monitoring result. In detail, the controller 7 is connected with the current source 9a, the switch 9b, the bias voltage source 9c, the hard pin 3f, and the modulator driving circuit 5c. The controller 7 controls the current source 9a to set light emission power of the laser diode 5a, and controls the switch 9b to control switching-on/off of a current flowing through the laser diode 5a to switch on/off the optical output signal. Further, the controller 7 controls the bias voltage source 9c to adjust a bias voltage applied to the EA modulator 5b. Furthermore, the controller 7 controls the modulator driving circuit 5c to adjust a cross point of the optical output signal.

At this time, the controller 7 generates a control value for various controls as a digital data by using the microprocessor, and converts the control value into an analog value and outputs the analog value by using the DA convertor. Therefore, since the control processing of the controller 7 is delayed by a time interval of a cyclic processing of the microprocessor, the switch 9b for rapidly shutting off the optical output signal is utilized to control switching-on/off of the optical output signal. When receiving the alarm signal $ALM_1$ from the multiplexing part 3 and perceiving occurrence/recovery of anomaly of the reference clock $CL_2$ or the electrical signals $D_1$, $D_2$, $D_3$, and $D_4$ as an interrupt processing, the controller 7 directly controls the switch 9b through a digital port to switch on/off the optical output signal.

Figure 3:
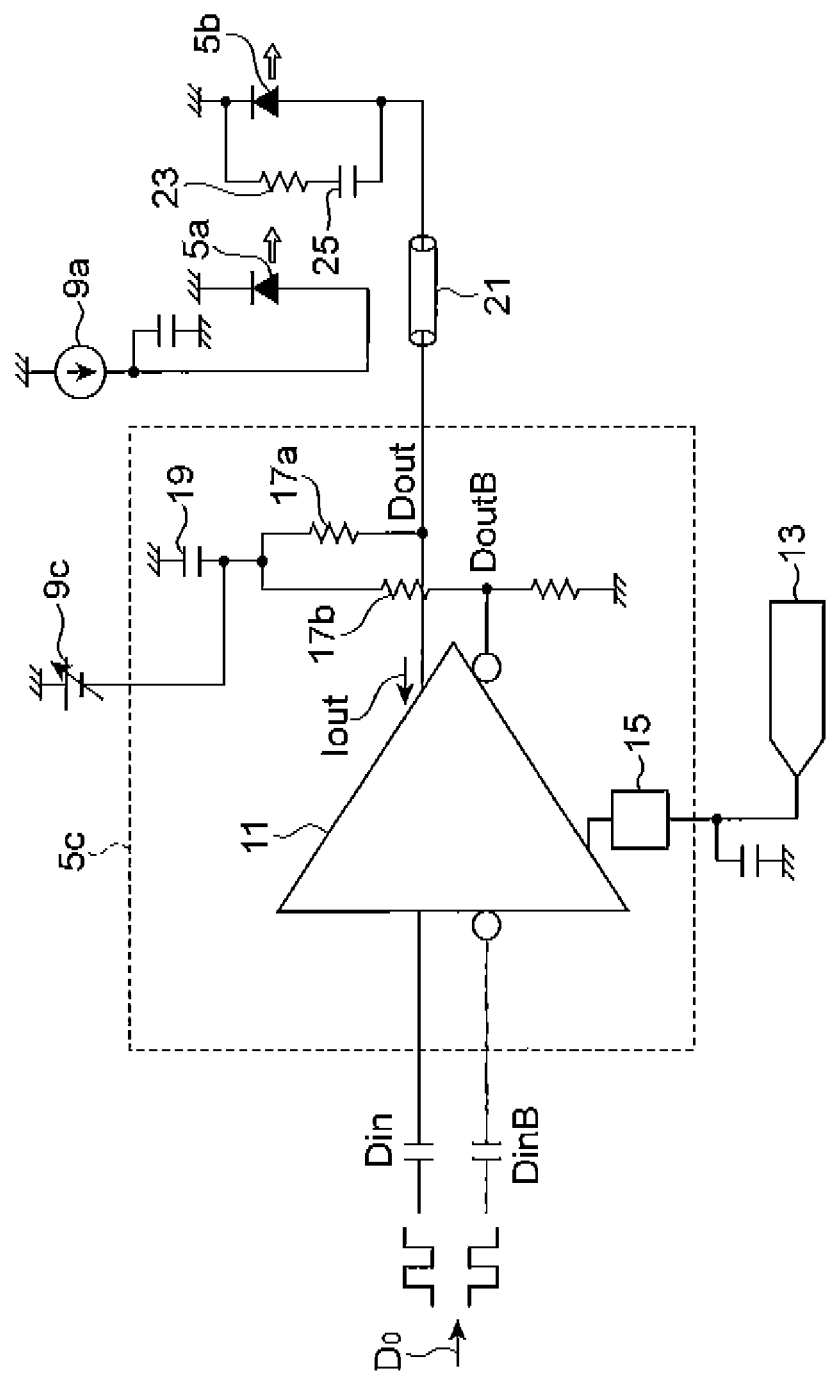
FIG. 3 is a circuit diagram illustrating a detailed configuration of an optical transmitter module 5 of FIG. 1.

FIG. 3 is a circuit diagram illustrating a detailed configuration of the optical transmitter module 5 of FIG. 2. As illustrated in FIG. 3, the optical transmitter module 5 includes a buffer circuit 11 for receiving the electrical signal $D_0$ (actually, treated as a pair of complementary signals Din and DinB having opposite phases to each other) to generate a pair of complementary outputs Dout and DoutB, a cross point adjustment circuit 15 for receiving an adjustment voltage from a control terminal 13 to adjust a cross point of the two complementary outputs Dout and DoutB, terminating resistors 17a and 17b for electrically terminating the two complementary outputs Dout and DoutB, a capacitor 19 connected to the terminating resistors 17a and 17b in series to stabilize a bias voltage common to the two complementary outputs Dout and DoutB, and a bias voltage source 9c connected to both of the two complementary outputs Dout and DoutB via the terminating resistors 17a and 17b. Further, the complementary output Dout is output to the EA modulator 5b via a transmission line 21, and a series circuit configured by a terminating resistor 23 and a capacitor 25 for cutting a DC component is connected with both ends of the EA modulator 5b in parallel.

Figure 4:
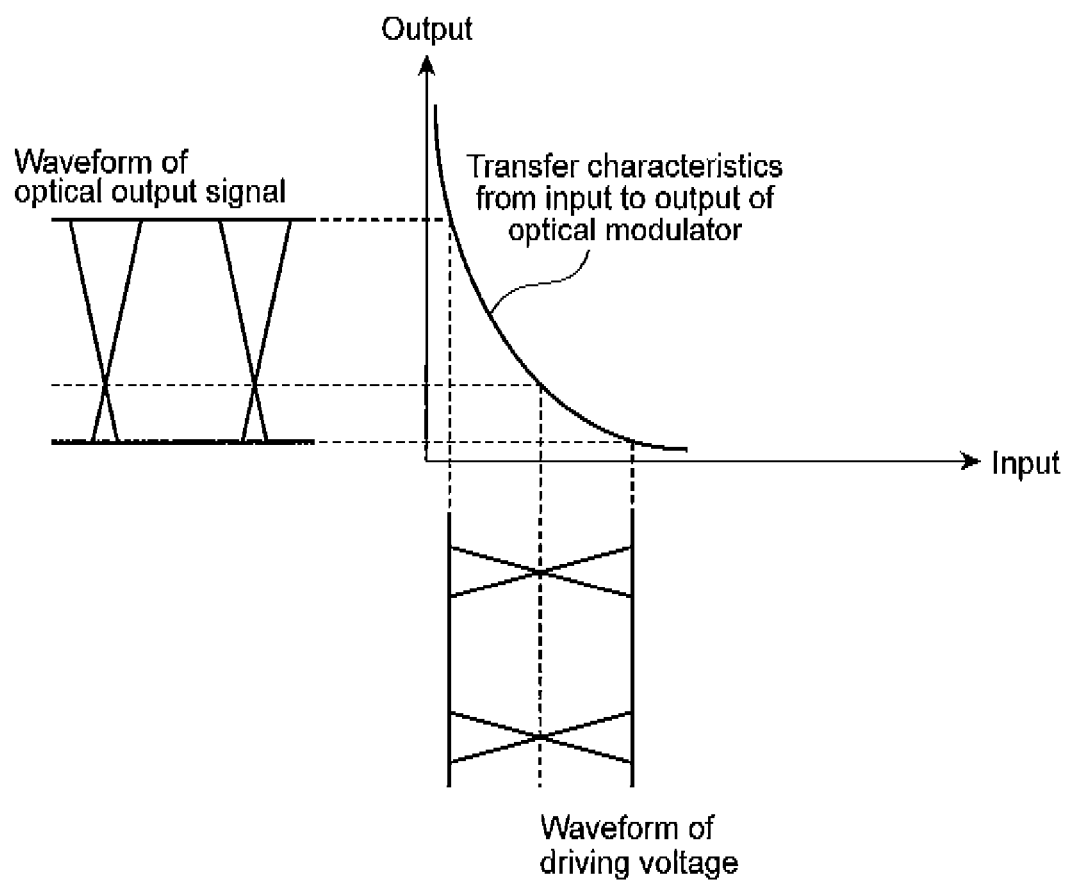
FIG. 4 is a graph showing a transfer characteristics from an input voltage to an optical output power of a general EA modulator.

FIG. 4 illustrates transfer characteristics from an input voltage to an optical output power of a general EA modulator. In this way, in the EA modulator, the relationship between the input voltage and the optical output power output from the modulator is nonlinear, and a cross point of the input voltage is required to be adjusted in order to optimize a cross point of an optical output waveform. Thus, in the above-configured optical transmitter module 5, the controller 7 performs a control to adjust a voltage of the control terminal 13, to provide an offset voltage between the complementary signals inside the buffer circuit 11, so as to adjust a cross point of the two complementary outputs Dout and DoutB.

Figure 5:
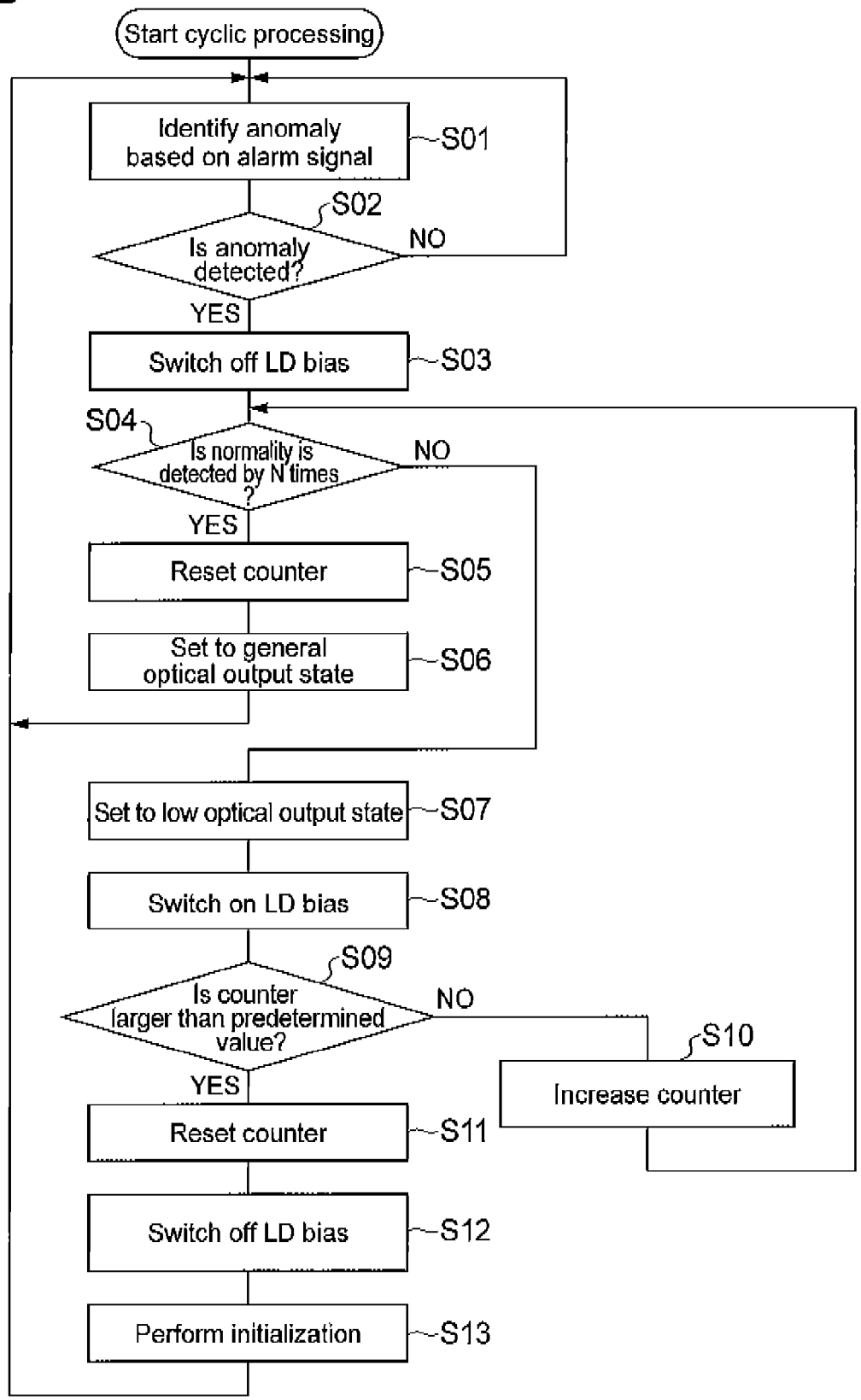
FIG. 5 is a flowchart illustrating a control sequence of the controller 7 of FIG. 1.

Next, an control sequence of switching-on/off of an optical output signal by the controller 7 will be described with reference to FIG. 5. FIG. 5 is a flowchart illustrating a control sequence of the controller 7.

A microprocessor cyclically repeats a predetermined processing (performs cyclic processing) according to a micro program (firmware), so that monitoring processing and control processing by the controller 7 are executed. First, when the cyclic processing starts, the alarm signal $ALM_1$ from the multiplexing part 3 can be accepted by the controller 7 as interrupt processing, and it is identified whether the anomaly of the reference clock $CL_2$ or the electrical signals $D_1$, $D_2$, $D_3$ and $D_4$ (hereinafter, simply referred to as "transmission difficulties") occurs (step S01, identifying of the anomaly). As a result, when an occurrence of the transmission difficulties is not identified (step S02; NO), the identifying of the anomaly is performed again at a next cycle. Meanwhile, when an occurrence of the transmission difficulties is identified (step S02; YES), the switch 9b is controlled by the controller 7, so as to shut off the optical output signal (step S03).

Thereafter, the identifying of the anomaly is performed again by the cyclic processing, so that it is determined whether a state (hereinafter, simply referred to as "normal state") where the anomalies of the reference clock $CL_2$ and the electrical signals $D_1$, $D_2$, $D_3$, and $D_4$ are not occurred is identified by N times (N is a specified integer) continuously (step S04). When it is judged that the normal state is identified by N times continuously (step S04; YES), a counter stored in the controller 7 is reset (step S05), and then a driving current of the laser diode 5a, a cross point of outputs of the buffer circuit 11, and a bias voltage of the EA modulator 5b are set to values of a general state (general setting values)(general optical output state), so that the optical output signal returns to a general state (step S06). Further, the process returns to step S01, and the identifying of the anomaly is then performed again. In this way, the process returns to the general state when the recovery from the anomaly is judged by several times, so that excessive light emission is prevented even if the phase locked loop circuit 3b incorrectly returns the alarm signal due to a higher harmonic wave of the reference clock, and so on.

Meanwhile, when the transmission difficulties continues, or the signals return to the normal state but the recovery is not identified by N times continuously (step S04; NO), the optical output power is set to a predetermined low value by the controller 7 (low optical output state). That is, any one or all of the driving current of the laser diode 5a, the cross point of the outputs of the buffer circuit 11, and the bias voltage of the EA modulator 5b are controlled as a preset value (low optical output set value) at which the excessive light emission is prevented, by the controller 7 (step S07). Thereafter, the bias current of the laser diode 5a which is shut off in step S03 is switched on by the control of the switch 9b (step S08).

Next, it is judged whether the counter inside the controller 7 reaches a predetermined value (step S09). When the counter does not reach the predetermined value (step S09; NO), the counter is incremented by 1, and the process then returns to step S04 (step S10). Meanwhile, when the counter reaches the predetermined value (step S09; YES), it is judged that an occurrence of the transmission difficulties is continuing for a long time, and the controller 7 and the multiplexing part 3 are initialized. In detail, the counter of the controller 7 is reset (step S11), the bias current of the laser diode 5a is switched on (step S12), and the controller 7 and the multiplexing part 3 is initialized (step S13). Thereafter, the process returns to step S01, and the identifying of the anomaly is then performed again. Therefore, after the reference clock, and so on return to the normal state, an automatic return is executed smoothly. Here, a value at which the initialization processing is not repeated due to noise, and so on and an operation is not unstable, for example, a value corresponding to a sufficient long time period of about 3 seconds is set to the predetermined value referenced in the judgement of step S09.

By the above-mentioned optical transceiver 1, a jitter component of the reference clock $CL_1$ from the outside is removed by the phase locked loop circuit 3a, and then reproduction of the reference clock $CL_2$ output from the phase locked loop circuit 3a and detection of anomaly of a frequency of the reference clock $CL_2$ are performed by the phase locked loop circuit 3b, and the optical output signal is output by the frame processing part 3d, the multiplexing processing part 3e, and the optical transmitter module 5 based on the reference clock $CL_3$ output from the phase locked loop circuit 3b and the electrical signals $D_1, D_2, D_3$, and $D_4$ from the outside. Further, the controller 7 performs a control such that the optical output signal is shut off when the alarm signal $ALM_1$ is received from the phase locked loop circuit 3b. Therefore, the detection of the anomaly of the reference clock is not delayed for the jitter component removal function, and the optical output signal is controlled to be rapidly shut off according to the anomaly detection so that the excessive light emission is prevented even if a configuration of the circuit is simple.

Here, since a bandwidth of jitter transfer of the phase locked loop circuit 3a is narrower than a bandwidth of jitter transfer of the phase locked loop circuit 3b, it is possible to achieve both the jitter removal processing of the reference clock and the prompt anomaly detection processing of the reference clock.

Further, since a response time of the alarm signal $ALM_1$ of the phase locked loop circuit 3b is reduced because of the widened bandwidth of jitter transfer of the phase locked loop circuit 3b, the time period of the anomaly detection processing of the reference clock is optimized, so as to securely prevent the excessive light emission. For example, since the PLL bandwidth of the phase locked loop circuit 3b is set to a large value such as several MHz, the output response time of the alarm signal $ALM_1$ is reduced to be less than or equal to 1 μsec.

Further, when the reference clock $CL_1$ is abnormal, the phase locked loop circuit 3a performs free-running oscillation and outputs the reference clock $CL_2$ having a predetermined frequency which is generated from the free-running oscillation. Therefore, since a clock having a specified frequency is supplied to the multiplexing part 3 even when the reference clock is abnormal, the controller 7 prevents the excessive light emission that may be caused by switching off the multiplexed electrical signal $D_0$ by the multiplexing part 3.

Figure 9:
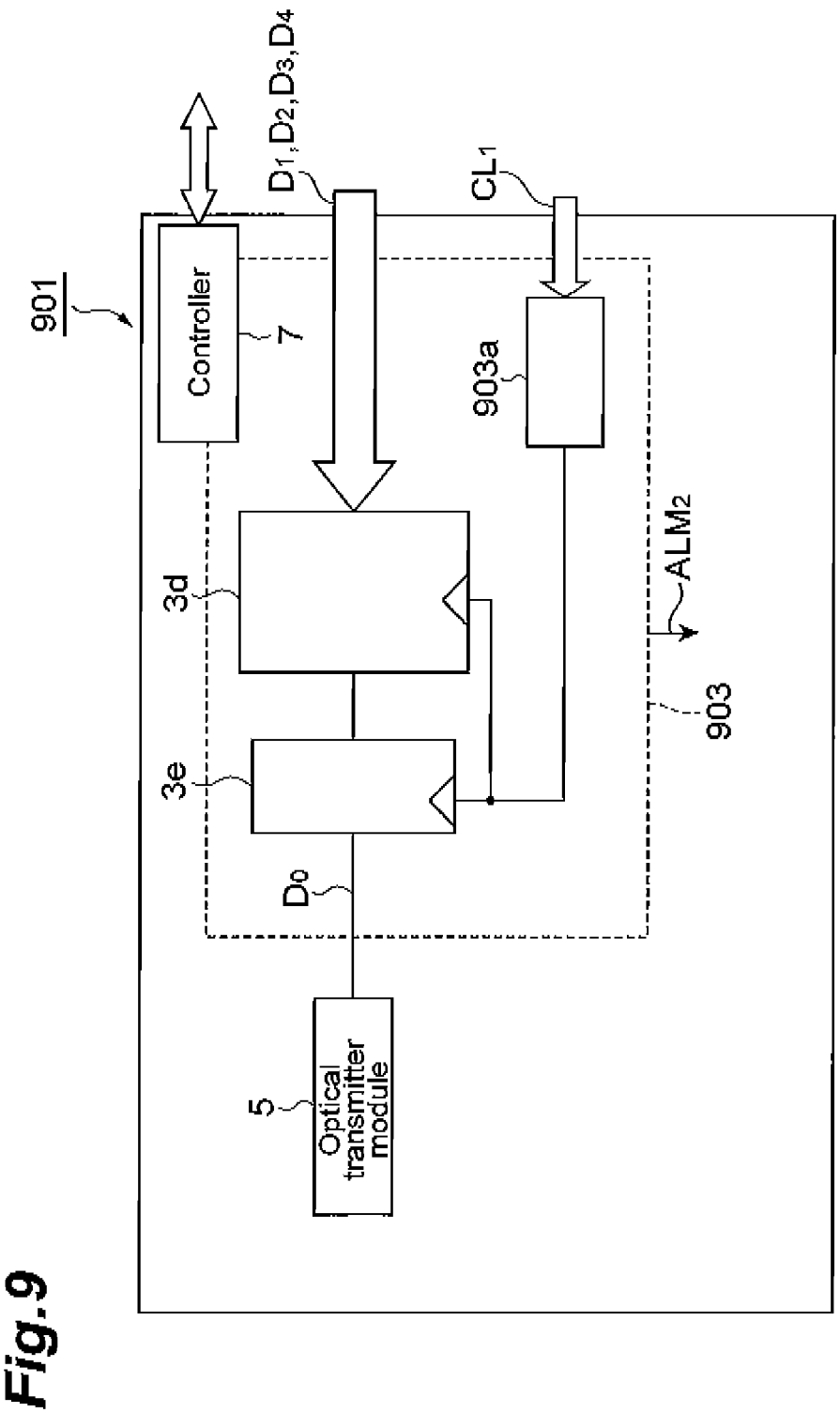
FIG. 9 is a block diagram illustrating a schematic configuration of an optical transmitter according to a comparative embodiment of the present invention.

Effects of the optical transceiver according to the present embodiment will be described as compared with a comparative embodiment. FIG. 9 illustrates a configuration of the optical transceiver 901 according to the comparative embodiment of the present invention. A different point between the optical transceiver 901 illustrated in FIG. 9 and the optical transceiver 1 according to the present embodiment is that the two stage configuration of the phase locked loop circuits 3a and 3b is changed to a one stage configuration of a phase locked loop circuit 903a. The phase locked loop circuit 903a provided at the optical transceiver 901 is required to have a narrow PLL bandwidth of below 1 KHz in order to satisfy a jitter standard permitted to an optical transmission signal of a public communication network having an optical transmission rate of 40 Gbps. In such a configuration, a response time of an alarm signal $ALM_2$ which a multiplexing part 903 outputs is varied according to a time constant of the phase locked loop circuit 903a in the multiplexing part 903, and when the bandwidth is lower than or equal to 1 KHz, the response time is several msec. In such a response time, shutting-off of the optical output signal is delayed, and failure may be caused at a receiving circuit opposing the optical transceiver 901. In contrast, in the present embodiment, since the two stage configuration of the phase locked loop circuit 3a and 3b is applied, the response time of the alarm signal $ALM_1$ is sufficiently reduced while a requirement for a jitter suppression is satisfied, so that the excessive light emission is securely prevented.

Further, in the optical transceiver 1 according to the present embodiment, when an occurrence of the transmission difficulties is detected by the alarm signal $ALM_1$, the bias current of the laser diode 5a is switched off so that the optical output signal is shut off. In contrast, in the general optical transceiver according to the related prior art, when the reference clock or the electrical signals from the outside are abnormal, the multiplexed electrical signal is switched off in order to prevent transmitting of random noise to the public communication network. However, in the optical transceiver having a cross point adjustment function disclosed in Japanese Patent Laid-Open Publication No. 2000-059317 or Japanese Patent Laid-Open Publication No. 2004-312396, when the multiplexed electrical signal is switched off, optical power higher than that of the switched-on state may be output and cause an excessive light emission.

Figure 6:
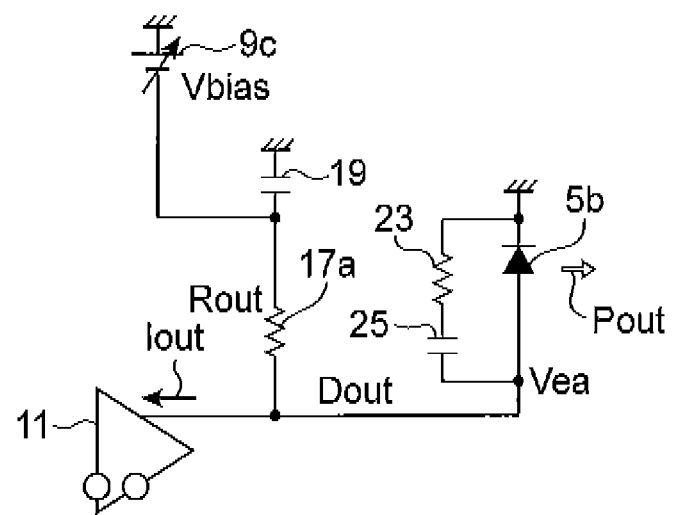
FIG. 6 illustrates a connection state between an EA modulator 5b and a modulator driving circuit 5c of the optical transmitter module 5 of FIG. 3.

The above-mentioned problem of the related prior art will be described in more detail. FIG. 6 illustrates a connection configuration of the EA modulator 5b and the modulator driving circuit 5c of the optical transmitter module 5. In general, when the EA modulator is driven, a cross point of the applied voltage Vea is shifted to a high level side in order to compensate the nonlinearity of the transfer characteristics of the EA modulator thereof (See FIG. 4). In such a state, since the sinking current Iout of the buffer circuit 11 is diminished to almost zero when the multiplexed electrical signal is switched off, a voltage drop by the terminating resistor 17a having a resistance Rout decreases, and the bias voltage Vbias itself applied by the bias voltage source 9c comes to the applied voltage Vea. Accordingly, the applied voltage Vea rises larger than a cross point voltage when the multiplexed electrical signal is switched on. Thus, an optical output power Pout of the EA modulator 5b in the off-state of the multiplexed electrical signal rises larger than an average output level in the on-state of the multiplexed electrical signal, so as to cause an excessive light emission.

Figure 7:
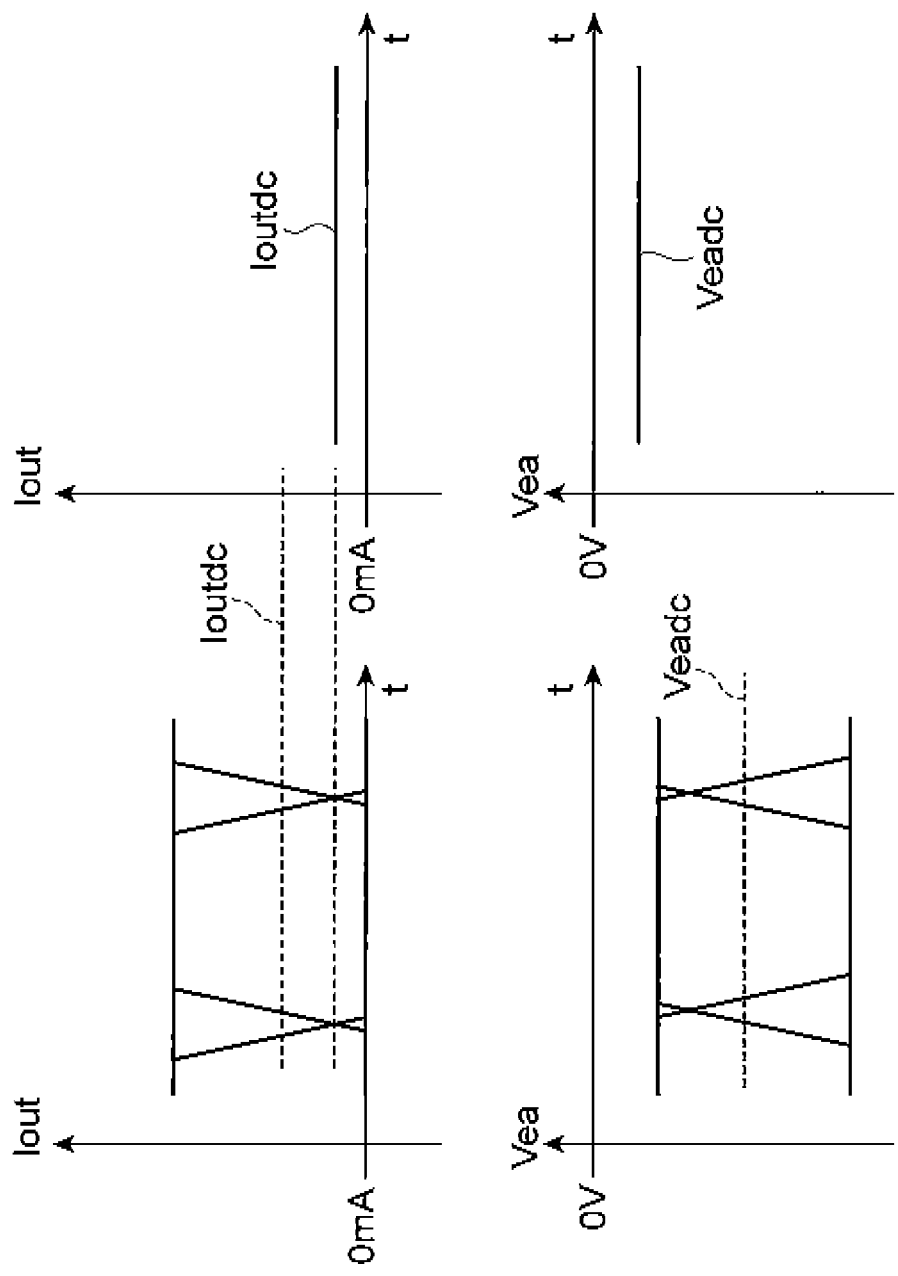
FIG. 7 are graphs showing waveforms of waveforms of a sinking current Iout and an applied voltage Vea of an EA modulator when a multiplexed electrical signal is in an on-state, and a waveform of an optical sinking current (photocurrent) Iout and an applied voltage Vea of an EA modulator when a multiplexed electrical signal is in an off-state.

FIG. 7 illustrates changes in waveforms of the sinking current Iout and the applied voltage Vea when the multiplexed electrical signal is switched on and switched off. An average value of a DC component of the applied voltage Vea may be calculated by the following equation;

$$Veadc = -Ioutdc \times Rout + Vbias$$

Where Ioutdc denotes a DC component of the sinking current Iout.

The DC component Ioutdc of the sinking current in the off state of the multiplexed electrical signal converges to a current value of a cross point in the on state of the multiplexed electrical signal. The reason is because the cross point is adjusted by giving an offset voltage between the complementary outputs. Further, when the multiplexed signal is switched on, the DC component Ioutdc is obtained by integrating the sinking current Iout along a time axis and averaging the integrated value, and does not largely deviate from 50% of a peak current even when the cross point is shifted.

FIG. 8 illustrates an example where a DC component Veadc when the multiplexed signal is switched on and switched off is calculated in detail by using the above equation. Herein, a peak value of the sinking current Iout is set to 80 mA, and the cross point in the on state of the multiplexed signal is set to 85% for the applied voltage Vea, that is equivalently 15% for the sinking current Iout. A ratio of the DC component Ioutdc to the peak value is 15% when the multiplexed signal is switched off, and is about 45% when the multiplexed signal is switched on, although the ratio depends on a rising time, a falling time, or a signal pattern. As a result of calculating the DC component Veadc, the DC component Veadc is −2.3 V when the multiplexed signal is switched on, and is −1.1 V when the multiplexed signal is switched off. Since the optical output power Pout becomes larger when the applied voltage Vea is higher, the excessive light emission is caused when the multiplexed signal is switched off, as compared to when the multiplexed signal is switched on.

In the present embodiment, the optical output signal is shut off when an occurrence of the transmission difficulties is detected by the alarm signal $ALM_1$. Therefore, the excessive light emission is securely prevented even when a modulator driving circuit with the cross point adjustment function is used.

In the above, although principles of the present invention have been illustrated and described in the preferred embodiment, it is understood by those skilled in the art that arrangement and details of the present invention may be changed without departing from the principles. The present invention is not limited to a specific configuration disclosed in the present embodiment. Thus, the scope of the present invention includes all modifications and variations which can be derived from the appended claims and the spirits thereof.

For example, in the optical transceiver 1 of the present embodiment, the driving current supplied to the laser diode 5a is controlled to be shut off when an occurrence of the transmission difficulties is detected by the alarm signal $ALM_1$. However, other methods may be adopted as the method to prevent the excessive light emission. In detail, the controller 7 performs a control, such that the control voltage of the control terminal 13 when the multiplexed signal is switched off is changed to set the cross point of the sinking current Iout to 45%, which is equal to the value when the multiplexed signal is switched on, such that the DC component Veadc should not be changed regardless of the state of the multiplexed electrical signal.

Second Embodiment

Figure 10:
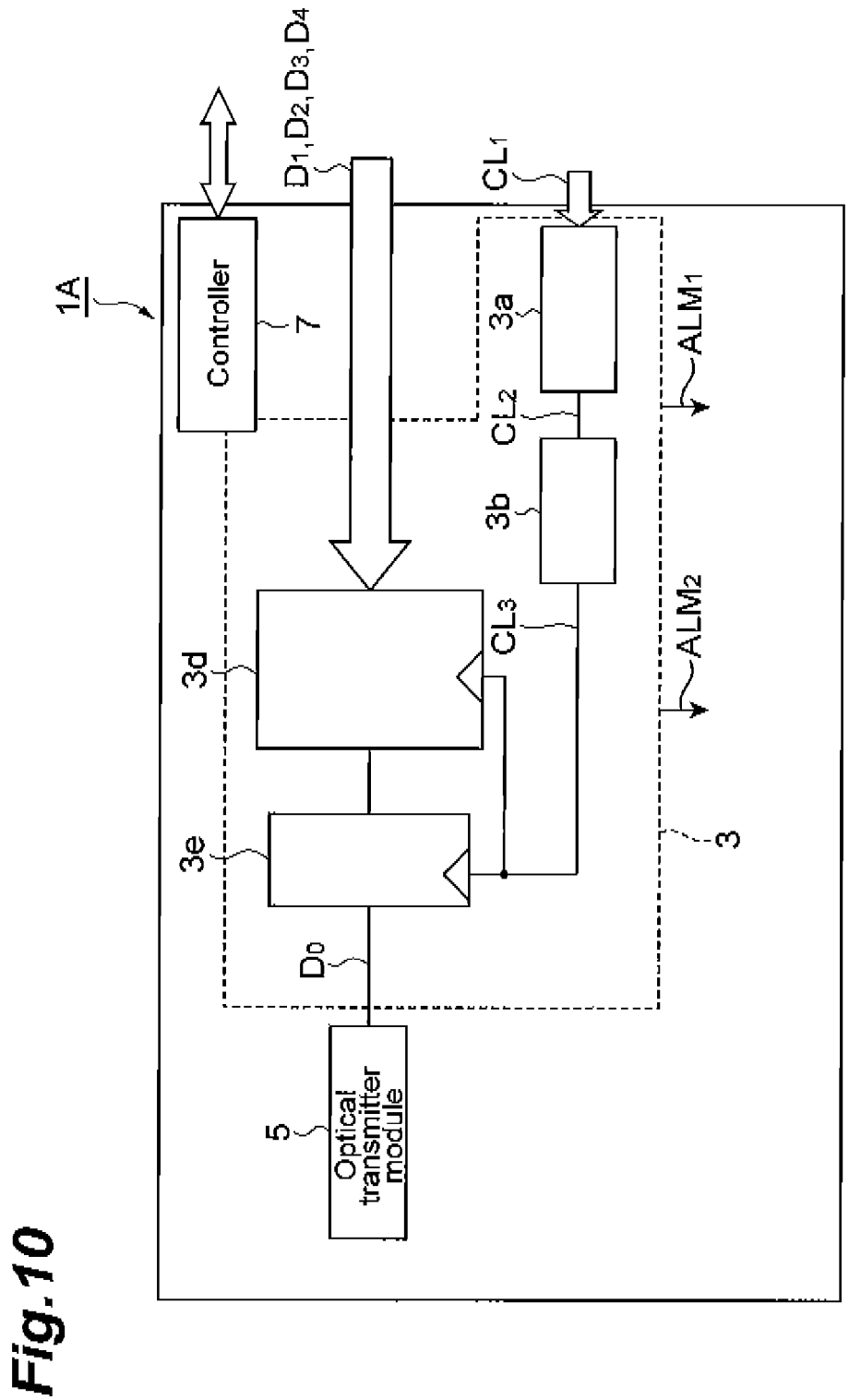
FIG. 10 is a block diagram illustrating a schematic configuration of an optical transmitter according to a second embodiment of the present invention.
Figure 11:
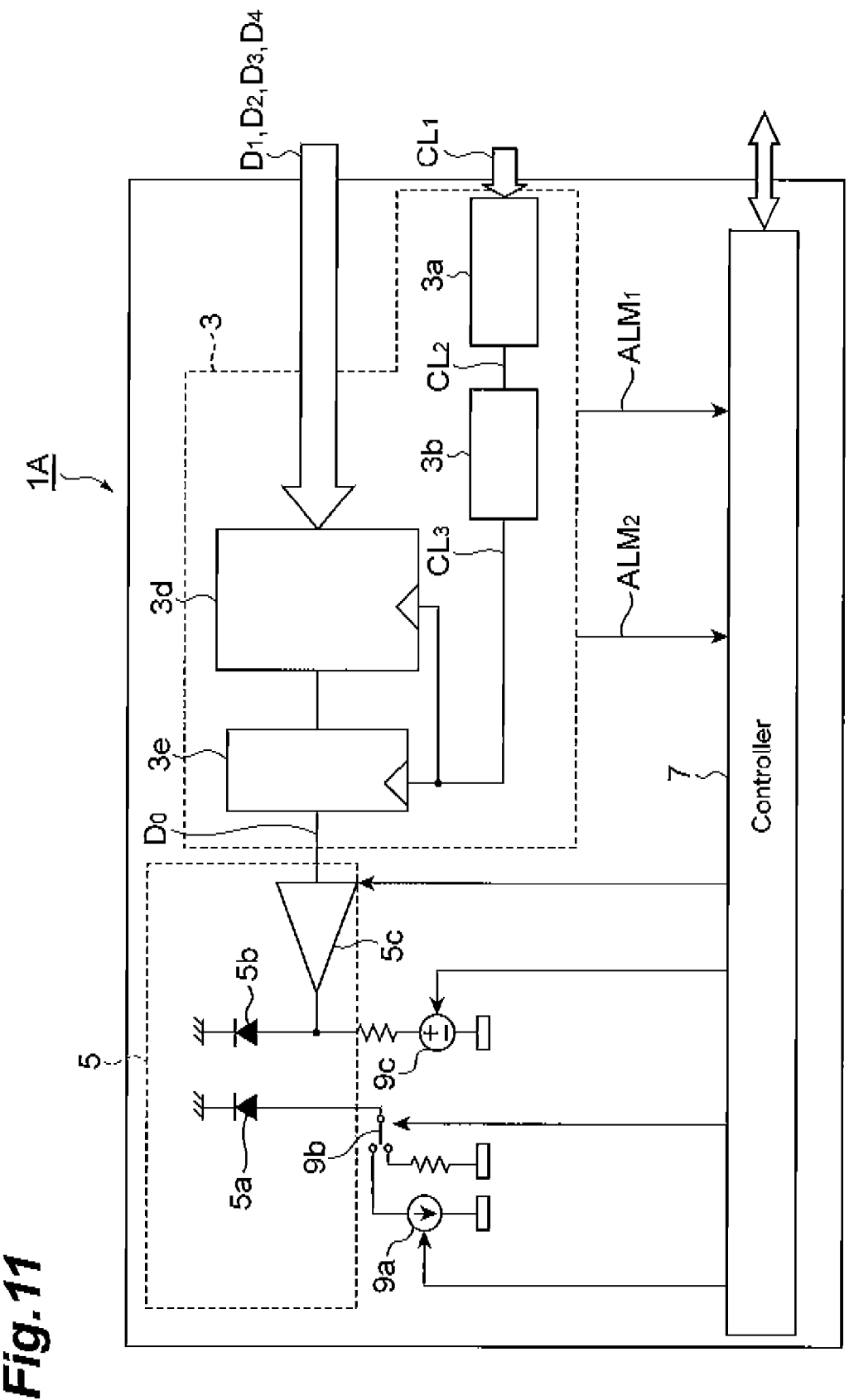
FIG. 11 is a block diagram illustrating a connection configuration of a controller of the optical transmitter of FIG. 10 in detail.

A configuration of an optical transceiver 1A according to a second embodiment will be described with reference to FIGS. 10 and 11. As illustrated in FIGS. 1 and 2, the optical transceiver 1A includes a multiplexing part 3 for receiving a reference clock signal and four pairs of electrical signals synchronized with the reference clock signal, which transmission rate is, for example, 10 Gbps from an external host system, and multiplexing these signals to an electrical signal having a transmission rate of, for example, 40 Gbps to output the signal, an optical transmitter module 5 (optical transmitting circuit) for generating an optical output signal based on the electrical signal received from the multiplexing part 3 to output the optical output signal to an optical transmission network, and a controller 7 (control circuit).

The multiplexing part 3 is configured by Integrated Circuits (ICs) and mainly includes phase locked loop circuits 3a and 3b, a frame processing part 3d, and multiplexing processing part 3e. In detail, the phase locked loop circuit 3a is configured on a separate integrated circuit different from an integrated circuit on which the phase locked loop circuit (frequency multiplication circuit) 3b, the frame processing part 3d, and the multiplexing processing part 3e are configured. The phase locked loop circuit 3a receives a reference clock $CL_1$ having a predetermined frequency from the outside, removes a jitter component of the reference clock $CL_1$, and outputs the reference clock $CL_2$. The phase locked loop circuit 3a is configured by a phase locked loop circuit, the PLL bandwidth of which is narrowed to be lower than or equal to 1 KHz, to sufficiently remove the jitter component of the reference clock $CL_1$. The phase locked loop circuit (frequency multiplication circuit) 3b receives the reference clock $CL_2$ output from the phase locked loop circuit 3a, generates a multiplied clock (first clock signal) $CL_3$ from the reference clock $CL_2$, and outputs the multiplied clock $CL_3$. The phase locked loop circuit 3b has a PLL bandwidth which is widened to be higher than or equal to several MHz, as compared to the phase locked loop circuit 3a. Further, when the frequency of the input reference clock $CL_2$ deviates from a predetermined frequency range or the amplitude of the reference clock $CL_2$ is smaller than a specified value, the phase locked loop circuit 3b judges these cases to be abnormal for the reference clock $CL_2$, and outputs an alarm signal $ALM_1$ (first alarm signal). In addition, when a frequency of the reference clock $CL_2$ deviates from a predetermined frequency range so that the reference clock $CL_2$ is judged to be abnormal, the phase locked loop circuit 3b performs free-running oscillation to generate the reference clock $CL_2$ having a predetermined frequency.

For example, the phase locked loop circuit 3b of the multiplexing part 3 generates a multiplied clock corresponding to a transmission rate of an electrical signal from the host system and a multiplied clock corresponding to a transmission rate of an electrical signal multiplexed by the multiplexing processing part 3e, and outputs the multiplied clocks to the frame processing part 3d and the multiplexing processing part 3e, respectively.

The frame processing part 3d is configured by a clock data recovery circuit and a First-In-First-Out (FIFO) memory, receives four pairs of electrical signals $D_1$, $D_2$, $D_3$, and $D_4$ from the host system, and the multiplied clock (first clock signal) from the phase locked loop circuit 3b, and extracts a clock signal (second clock signal) synchronized with all of the electrical signals $D_1$, $D_2$, $D_3$, and $D_4$ from one or more or all of the electrical signals $D_1$, $D_2$, $D_3$, and $D_4$ to generate the clock signal. Further, the frame processing part 3d reads data from each of the electrical signals D1, D2, D3, and D4 in synchronization with the extracted clock, reads the data in the FIFO memory therein, and then output the data corresponding to each of the electrical signals D1, D2, D3, and D4 from the FIFO memory in synchronization with the multiplied clock generated by the phase locked loop circuit 3b. By the frame processing of the frame processing part 3d, time series data included in the four pairs of electrical signals is synchronized to be sequentially output to the multiplexing processing part 3e, so that the four pairs of electrical signals are synchronized with each other and output. Further, when the anomaly of the transmission rate or the amplitude of the electrical signals D1, D2, D3, and D4 is detected and when the clock (second clock signal) extracted from the electrical signal D1, D2, D3, and D4 and the multiplied clock (first clock signal) obtained from the phase locked loop circuit (frequency multiplication circuit) 3b are not synchronized with each other, the frame processing part 3d outputs an alarm signal (second alarm signal) $ALM_2$. For example, the frame processing part 3d monitors pointers of the FIFO memory to monitor a writing position and a reading position of data, and detects loss of synchronization between the clocks when positions of both the pointers are largely separated.

The multiplexing processing part 3e receives the four pairs of time-series data from the frame processing part 3d and multiplexes the time-series data by using the multiplied clocks generated by the phase locked loop circuit 3b. By the multiplexing, an electrical signal $D_0$ is generated by multiplexing the four pairs of time-series data and is output to the optical transmitter module 5.

The optical transmitter module 5 includes a laser diode 5a for generating an optical output signal, an EA modulator 5b for modulating the optical output signal, and a modulator driving circuit 5c for driving the EA modulator 5b. The modulator driving circuit 5c modulates the optical output signal transmitted from the laser diode 5a to the outside based on data included in the electrical signal $D_0$ by increasing and decreasing a driving voltage applied to the EA modulator 5b based on the electrical signal $D_0$ output from the multiplexing part 3. In the optical transmitter module 5 having such a configuration, a current source 9a for supplying a bias current to the laser diode 5a is connected to the laser diode 5a via a switch 9b, and a bias voltage source 9c for applying a bias voltage to the EA modulator 5b is connected to the EA modulator 5b.

The controller 7 corresponds to a digital control circuit, with an embedded analogue circuit configured by a microprocessor, DA convertors, AD convertors, memories, and so on. The controller 7 receives various setting information from the host system to control each of the parts of the optical transceiver 1A, monitors the status of the parts of the optical transceiver 1A and a state of a signal from the outside, and concurrently notifies the host system of various information such as an alarm signal according to the monitoring result. In detail, the controller 7 is connected with the multiplexing part 3, the current source 9a, the switch 9b, the bias voltage source 9c, and the modulator driving circuit 5c. The controller 7 controls the current source 9a to set light emission intensity of the laser diode 5a, and controls the switch 9b to control switching-on/off of a current flowing through the laser diode 5a to switch on/off the optical output signal. Further, the controller 7 controls the bias voltage source 9c to adjust a bias voltage applied to the EA modulator 5b. Further, the controller 7 controls the modulator driving circuit 5c to adjust a cross point of the optical output signal.

At this time, the controller 7 generates a control value for various controls as digital data by the microprocessor, and converts the control value into an analog value and outputs the analog value by using the DA convertor. Therefore, since the control processing of the controller 7 is delayed by a time interval of a cyclic processing of the microprocessor, the switch 9b for rapidly shutting off the optical output signal is utilized to control switching-on/off of the optical output signal. When receiving the alarm signal $ALM_1$ from the multiplexing part 3 and perceiving by an interrupt processing of anomaly of the reference clock $CL_2$ or the electrical signals $D_1$, $D_2$, $D_3$, and $D_4$ or loss of synchronization between the clocks extracted from the electrical signals $D_1$, $D_2$, $D_3$, and $D_4$ and the multiplied clock from the phase locked loop circuit 3b, the controller 7 controls the switch 9b to shut off the optical output signal. Further, when the alarm signal $ALM_1$ or the alarm signal $ALM_2$ is recovered, the controller 7 performs a control to reset a circuit unit including the phase locked loop circuit 3a and then reset an integrated circuit unit including the phase locked loop circuit 3b, the frame processing part 3d, and the multiplexing processing part 3e.

Figure 12:
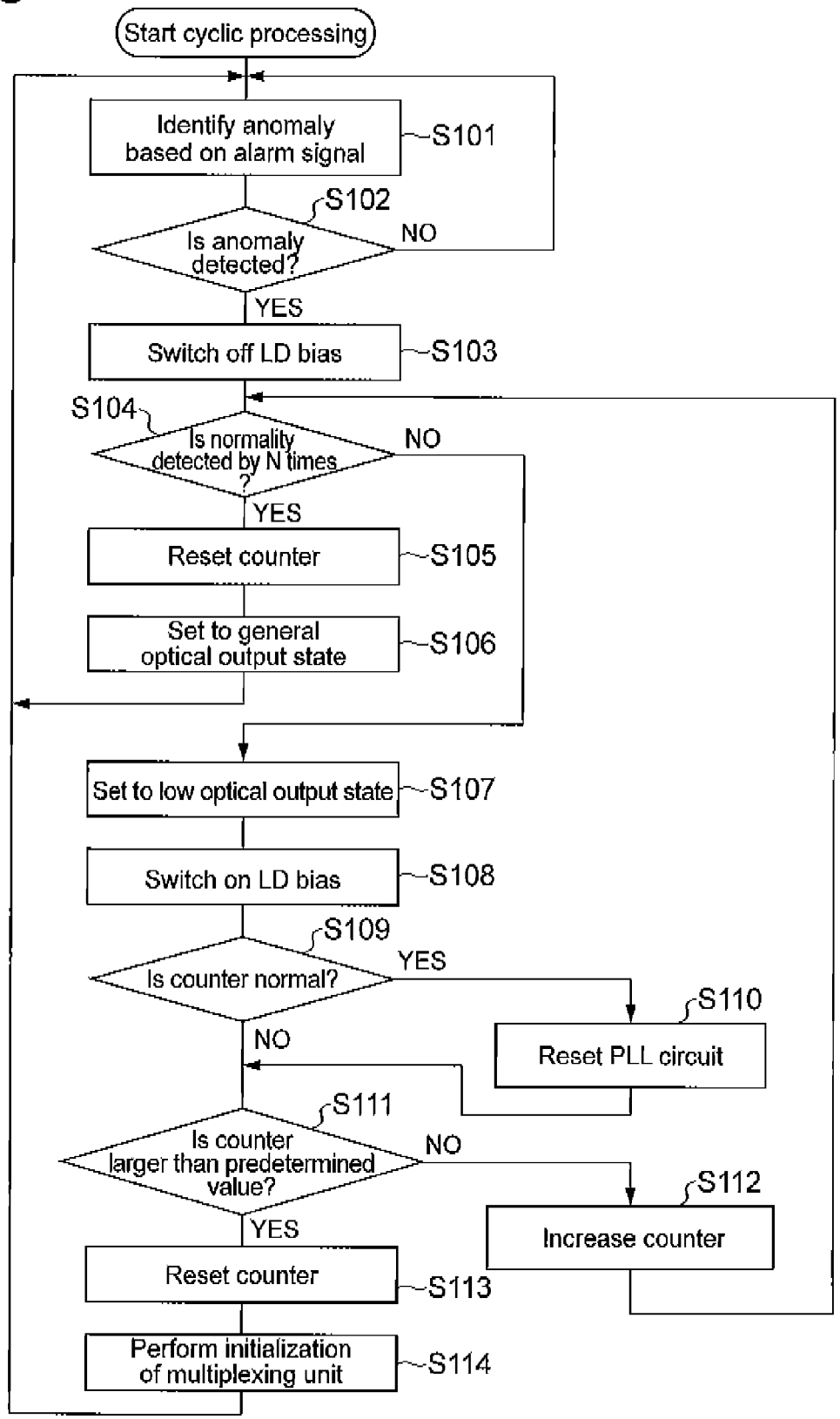
FIG. 12 is a flowchart illustrating a sequence of a control operation of the controller 7 of FIG. 10.

Next, an control sequence of switching-on/off of an optical output signal by the controller 7 of the optical transceiver 1A will be described with reference to FIG. 12. FIG. 12 is a flowchart illustrating a control sequence of the controller 7.

Monitoring processing and control processing by the controller 7 is executed by a cyclic processing by a microprocessor. First, when the cyclic processing starts, the alarm signals $ALM_1$ and $ALM_2$ from the multiplexing part 3 can be accepted by an interrupt processing, and it is identified whether anomalies of the reference clock $CL_2$ or the electrical signals D1, D2, D3, and D4 occurs (hereinafter, simply referred to as "transmission difficulties") or whether loss of synchronization between the clocks extracted from the electrical signals D1, D2, D3, and D4 and the clock from the phase locked loop circuit (frequency multiplication circuit) 3b occurs (hereinafter, simply "loss-of-synchronization")(step S101, the identifying process of the anomaly). As a result, when the transmission difficulties or the loss-of-synchronization is not identified (step S102; NO), the identifying process of the anomaly is performed again at a next cycle. Meanwhile, when the transmission difficulties or the loss-of-synchronization is identified (step S102; YES), the controller 7 controls the switch 9b to shut off the optical output signal (step S103).

Thereafter, the identifying process of the anomaly is performed again by the cyclic processing, so that it is judged whether a state (hereinafter, simply referred to as "normal state") where neither the transmission difficulties nor the loss-of-synchronization occur is identified by N times (N is a specified integer) continuously (step S104). When it is judged that the normal state is identified by N times continuously (step S104; YES), a counter stored in the controller 7 is reset (step S105), and then a driving current of the laser diode 5a, a cross point of a driving voltage of the modulator driving circuit 5c, and a bias voltage of the EA modulator 5b are set to values of a general state (general setting values), so that the optical output signal returns to a general state (step S106). Further, the process returns to step S101, and the identifying process of the anomaly is then performed again. In this way, the process returns to the general state when the recovery from the anomaly is judged by several times, so that excessive light emission is prevented even if the phase locked loop circuit 3b incorrectly returns the alarm signal due to a higher harmonic wave of the reference clock, and so on.

Meanwhile, when the transmission difficulties or the loss-of-synchronization continues, or the signals return to the normal state but the recovery is not identified by N times continuously (step S104; NO), a low optical output state is set by the controller 7. That is, the controller 7 performs a control to set any one or all of a driving current provided to the laser diode 5a, a cross point of a driving voltage provided to the EA modulator 5b by the modulator driving circuit 5c, and a bias voltage applied to the EA modulator 5b, to preset values (low optical output setting values) by which the excessive light emission is not caused (step S107). Thereafter, the bias current of the laser diode 5a which is shut off in step S103 is switched on by the control of the switch 9b (step S108).

Next, the controller 7 judges whether the alarm signal $ALM_1$ from the multiplexing part 3 is recovered (step S109). When it is judged that the alarm signal $ALM_1$ is recovered (step S109; YES), the controller 7 resets the phase locked loop circuit 3a to output the reference clock $CL_2$ having an accurate frequency (step S110). Meanwhile, when it is not judged that the alarm signal $ALM_1$ is recovered (step S109; NO), the phase locked loop circuit 3a is not reset. Further, it is judged whether the counter inside the controller 7 reaches a predetermined value (step S111). When the counter does not reach the predetermined value (step S111; NO), the counter is incremented by 1, and the process then returns to step S104 (step S112). Meanwhile, when the counter reaches the predetermined value (step S111; YES), it is judged that the transmission difficulties continues for a long time, and the multiplexing part 3 including the phase locked loop circuit 3b, the frame processing part 3d, and the multiplexing processing part 3e is initialized. In detail, the counter of the controller 7 is reset (step S113), and the multiplexing part 3 is then initialized (step S114). Thereafter, the process returns to step S101, and the identifying process of the anomaly is then performed again. By the initialization processing, after the alarm signal $ALM_2$ is released and the reference clock or the electrical input signals, and so on. return to a normal state, an automatic return may be then executed smoothly. Here, a value at which the initialization processing is not repeated due to noise, and so on. and an operation is not unstable, for example, a value corresponding to a sufficient long time period of about 3 seconds is set to the predetermined value referenced in the judgement of step S111.

By the above-mentioned optical transceiver 1A, the reference clock $CL_2$ is generated by the phase locked loop circuit 3a based on the reference clock $CL_1$ from the outside, the clock synchronized with the electrical input signals $D_1$, $D_2$, $D_3$, and $D_4$ from the outside is generated by the frame processing part 3d, data is read in based on the clock from the electrical input signals $D_1$, $D_2$, $D_3$, and $D_4$ and is then output based on the reference clock $CL_2$, and the optical output signal is output by the optical transmitter module 5 based on the data.

Further, in the FIFO memory of the frame processing part 3d, it is required that the clock of the electrical input signal $D_1$, $D_2$, $D_3$, and $D_4$ and the multiplied clock $CL_3$ have the same frequency, in order to avoid an overflow or an underflow. In consideration of this, when the reference clock $CL_2$ is abnormal or when the multiplied clock $CL_3$ and the clock extracted from the electrical input signals $D_1$, $D_2$, $D_3$, and $D_4$ are not synchronized with each other, the controller 7 detects the alarm signals $ALM_1$ and $ALM_2$ to shut off the optical output signal. Thereafter, when the electrical input signals $D_1$, $D_2$, $D_3$, and $D_4$ or the reference clock $CL_2$ returns rapidly and is then in an transient unstable state, only the simple resetting of the FIFO memory may cause the pointers to be stacked in a wrong state. As a result, the frame processing part 3d may not multiplex the signal correctly, and may transmit the incorrect optical output signal. In the present embodiment, when the alarm signal $ALM_1$ is recovered, the phase locked loop circuit 3a is reset and the frame processing part 3d is then reset, so that the reference clock $CL_2$ is prepared to be correctly supplied to the phase locked loop circuit 3b and the frame processing part 3d is then reset, so that the risk that the pointers of the FIFO memory are stacked can be reduced. Therefore, the processing of reading-in and reading-out of data from the electrical input signals $D_1$, $D_2$, $D_3$, and $D_4$ is normally initialized, and the optical output signal promptly returns to the normal state.

Further, in the present embodiment, when the alarm signals $ALM_1$ and $ALM_2$ are activated, the driving current supplied to the laser diode 5a is controlled to be shut off, so that the optical output signal is prevented from being transmitted in an abnormal state such as the excessive light emission. Thereafter, the controller 7 performs a control such that the driving signal provided to the laser diode 5a or the EA modulator 5b is set to a predetermined setting value for preventing the excessive light emission, and the setting value when the alarm signals $ALM_1$ and $ALM_2$ are recovered (deactivated) returns to a general setting value after the driving current of the laser diode 5a is switched on, so that when the alarm signals are recovered (deactivated), the overshooting of the optical output level caused by a rapid change in the bias current is reduced, and the incorrect optical output signal is prevented from being transmitted to the network.

In the above, although principles of the present invention have been illustrated and described in the preferred embodiment, it is understood by those skilled in the art that arrangement and details of the present invention may be changed without departing from the principles. The present invention is not limited to a specific configuration disclosed in the present embodiment. Thus, the scope of the present invention includes all modifications and variations which can be derived from the appended claims and the spirits thereof.

What is claimed is:

1. An optical transmitter comprising:
    a first phase locked loop circuit configured to receive a reference clock and remove a jitter component of the reference clock;
    a second phase locked loop circuit configured to receive an output of the first phase locked loop circuit, generate a multiplied clock synchronized with the output, and when a frequency of the output deviates from a predetermined range or when an amplitude of the output is smaller than a predetermined value, output an alarm signal; and
    an optical transmitting circuit configured to receive the multiplied clock and electrical signals from the outside, and output an optical output signal modulated based on the electrical signals.

2. The optical transmitter according to claim 1, wherein a bandwidth of jitter transfer of the first phase locked loop circuit is narrower than a bandwidth of jitter transfer of the second phase locked loop circuit.

3. The optical transmitter according to claim 1, wherein a response time of the alarm signal of the second phase locked loop circuit is reduced according to widening of the bandwidth of jitter transfer of the second phase locked loop circuit.

4. The optical transmitter according to claim 1, wherein the optical transmitting circuit has a control terminal to shut off the optical output signal, and when receiving the alarm signal through the control terminal, shuts off the optical output signal.

5. An optical transmitter comprising:
    a phase locked loop circuit configured to receive a reference clock signal from the outside, generate a first clock signal based on the reference clock signal, output the generated first clock signal, and when a frequency of the reference clock signal deviates from a predetermined range or when an amplitude of the reference clock signal is smaller than a predetermined value, output a first alarm signal;
    a frame processing part configured to receive the electrical input signal from the outside and the first clock signal from the phase locked loop circuit, generate a second clock signal synchronized with the electrical input signal, read in data based on the second clock signal from the electrical input signal, output the data based on the first clock signal, and when the first clock signal and the second clock signal are not synchronized with each other, output a second alarm signal;
    an optical transmitting circuit configured to output an optical output signal based on the data output from the frame processing part; and a control circuit configured to, when the first alarm signal or the second alarm signal is received, perform a control to shut off the optical output signal, and then when the first alarm signal or the second alarm signal is recovered, perform a control to reset the phase locked loop circuit and then reset the frame processing part.

6. The optical transmitter according to claim 5, wherein the optical transmitting circuit has a laser diode configured to generate an optical output signal and an optical modulator configured to modulate the optical output signal, and the control circuit is configured to, when the first alarm signal or the second alarm signal is received, perform a control to shut off a driving current supplied to the laser diode.

7. The optical transmitter according to claim 6, wherein the control circuit performs a control sequentially to shut off the driving current, set a driving signal provided to the laser diode or the optical modulator to a predetermined value for preventing excessive light emission, and switch on the driving current.

* * * * *